United States Patent
Sato et al.

(10) Patent No.: US 7,358,741 B2
(45) Date of Patent: Apr. 15, 2008

(54) ELECTROSTATIC DETECTION APPARATUS AND METHOD, AND COORDINATE DETECTION PROGRAM

(75) Inventors: Tadamitsu Sato, Tokyo (JP); Shuzo Ono, Tokyo (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/136,597

(22) Filed: May 23, 2005

(65) Prior Publication Data

US 2005/0275415 A1    Dec. 15, 2005

(30) Foreign Application Priority Data

May 25, 2004    (JP)    .............................. 2004-154187
Jul. 16, 2004    (JP)    .............................. 2004-209374

(51) Int. Cl.
  *G01R 29/12*    (2006.01)
  *G01R 27/26*    (2006.01)
(52) U.S. Cl. ........................ 324/457; 324/662; 324/688
(58) Field of Classification Search ................ 324/662, 324/688, 457
See application file for complete search history.

(56) References Cited

U.S. PATENT DOCUMENTS

| 6,707,093 | B2 * | 3/2004 | Siegel et al. ................. 257/302 |
| 6,828,806 | B1 * | 12/2004 | Hirota et al. ................ 324/688 |
| 2002/0121909 | A1 * | 9/2002 | Sato et al. ................... 324/686 |
| 2003/0052867 | A1 * | 3/2003 | Shigetaka et al. ........... 345/173 |
| 2003/0080755 | A1 * | 5/2003 | Kobayashi ................... 324/658 |

* cited by examiner

*Primary Examiner*—Andrew H. Hirshfeld
*Assistant Examiner*—Timothy J Dole
(74) *Attorney, Agent, or Firm*—Brinks Hofer Gilson & Lione

(57) ABSTRACT

A shielding member is provided as an electrostatic protection device in extension lines that extend from a sensing area to switching devices via extension areas correspondingly. As a result, even if a body to be detected such as a finger contacts the extension area, it is possible to reduce the amount of the change of an electrostatic capacitance with respect to the movement of the body to be detected. Therefore, it is possible to reduce influences exerted on data to be detected, and an electrostatic detection apparatus having improved coordinate detection accuracy can be provided.

2 Claims, 7 Drawing Sheets

ELECTROSTATIC DETECTION APPARATUS AND METHOD, AND COORDINATE DETECTION PROGRAM

This application claims the benefit of priority to Japanese Patent Application Nos. 2004-154187 filed on May 25, 2004 and 2004-209374 filed on Jul. 16, 2004, both herein incorporated by reference.

BACKGROUND OF THE INVENTION

1. Field of the Invention

The present invention relates to an electrostatic detection apparatus used in a touch panel and a glide point and, more particularly, relates to an electrostatic detection apparatus in which detection accuracy is improved by making it unsusceptible to influences from areas other than a sensing area.

2. Description of the Related Art

As a related art associated with an electrostatic detection apparatus according to the present invention, for example, a pad-type pointing device disclosed in, for example, U.S. Pat. No. 2003/0052867A1, is known.

In U.S. Pat. No. 2003/0052867A1, an X electrode layer 20X formed of a plurality of X electrodes x1, x2, ..., x15, x16 that extend in the X direction and that are arranged at a predetermined spacing in the Y direction on the under surface of a film substrate 10 is provided. An insulating film 12 is formed on the surface (under surface) of the X electrode layer 20X. Furthermore, a Y electrode layer 20Y formed of a plurality of Y electrodes y1, y2, ..., y15, y16 that extend in the Y direction and that are arranged at a predetermined spacing in the X direction on the surface (under surface) of the insulating film 12 is formed. That is, the X electrode layer 20X and the Y electrode layer 20Y are provided on the under surface of the film substrate 10 in such a manner as to be arranged to oppose each other in a matrix so as to intersect at right angles to each other via the insulating film 12.

The Y electrodes y1, y2, ..., y15, y16 and the X electrodes x1, x2, ..., x15, x16 extend via a through hole, a contact, electrodes, etc., provided in the edge portions of the insulating film 12. Finally, they are collected in an end portion Ds of an extension section 11 of the film substrate 10, and are connected therefrom to a conduction section 5 of a control substrate circuit 4.

The electrostatic detection apparatus detects the position of a body to be detected in the X and Y directions by detecting the change of an electrostatic capacitance formed between the body to be detected and each of the X electrodes and between the body to be detected and each of the Y electrodes when the body to be detected, such as a finger, is made to approach the X electrode layer and the Y electrode layer.

Therefore, in order to improve the detection accuracy in the X and Y directions, when the body to be detected approaches an electrode other than each of the X and Y electrodes, it is necessary that an electrostatic capacitance is not formed between those electrodes and the body to be detected, or it is necessary that, even if the electrostatic capacitance is formed, the amount of the change thereof is small.

However, in the electrostatic detection apparatus of the related art, the extension lines that extend from the end portions of the Y electrodes y1, y2, ..., y15, y16 and the X electrodes x1, x2, ..., x15, x16 and that extend up to a through hole are arranged so as to be adjacent to the Y electrodes and the X electrodes. Consequently, an electrostatic capacitance is easily formed between the extension lines and the body to be detected, and moreover, the amount of the change thereof cannot be decreased, presenting a problem in that it is difficult to improve the accuracy of position detection of the body to be detected in the X and Y directions.

SUMMARY OF THE INVENTION

The present invention has been made to solve the problems of the related art. An object of the present invention is to provide an electrostatic detection apparatus in which the accuracy of coordinate detection of a body to be detected is improved by making it unsusceptible to influences from areas other than a sensing area even when a routing-purpose extension line is provided in the vicinity of a sensing area.

Another object of the present invention is to provide an electrostatic detection apparatus in which the accuracy of coordinate detection is improved by preventing influences received from extension lines even when the routing-purpose extension lines are arranged densely in the vicinity of a sensing area.

Another object of the present invention is to provide an electrostatic detection apparatus and method in which portions of a sensing area can be used as operation keys formed from any desired shape in accordance with an operation mode, and a coordinate detection program.

To achieve the above-mentioned objects, in one aspect, the present invention provides an electrostatic detection apparatus including: a sensing area for detecting that a body to be detected contacts or approaches the sensing area; a plurality of sensor electrodes wired in the sensing area; a routing-purpose extension line for connecting the section between individual sensor electrodes and an external circuit provided outside the sensing area; and an extension area that is provided in the vicinity of the sensing area and in which the extension lines are arranged densely, wherein electrostatic protection means for suppressing the change of an electrostatic capacitance formed between the body to be detected and the extension line when the body to be detected contacts or approaches the extension area is provided in the extension area.

In the electrostatic detection apparatus, the electrostatic protection means is preferably formed by a shielding member that covers the extension area in which the extension lines are provided. More preferably, the shielding member is grounded.

The sensing area and the extension area may be integrally covered with a cover sheet, and the electrostatic protection means may be formed in such a manner that the plate thickness dimension of the cover sheet in the sensing area is formed thicker than the plate thickness dimension of the cover sheet in the extension area.

In the electrostatic detection apparatus, a step difference may be formed between the cover sheet provided in the sensing area and the cover sheet provided in the extension area, and the step difference may be formed in at least one of the obverse surface and the rear surface of the cover sheet.

The sensor electrodes may be such that a plurality of X electrodes that extend in the X direction and that are arranged at a predetermined spacing in the Y direction, and a plurality of Y electrodes that extend in the Y direction and that are arranged at a predetermined spacing in the X direction are arranged so as to oppose each other in a matrix in such a manner as to intersect at right angles to each other.

In the electrostatic detection apparatus of the present invention, the extension area is shielded, or the plate thickness dimension of the extension area within the cover sheet is formed thicker. Therefore, it is possible to cut off the electrostatic coupling between the body to be detected and the extension lines wired within the extension area, and it is possible to make it difficult for an electrostatic capacitance to be formed therebetween.

Alternatively, even if an electrostatic capacitance is formed, since the amount of the change thereof with respect to the movement of the body to be detected can be reduced, it is possible to decrease influences exerted on the detection accuracy.

That is, the positional detection accuracy of the electrostatic detection apparatus can be improved.

In another aspect, the present invention provides an electrostatic detection apparatus for detecting a coordinate position by using a programmed computer, the electrostatic detection apparatus including: a sensing area to which a body to be detected contacts or approaches; a plurality of sensor electrodes in which an electrostatic capacitance is formed as a coordinate in a sensing area and that output the position of the body to be detected as a data signal indicating the change of the electrostatic capacitance; an extension line for connecting the section between the individual sensor electrodes and an external circuit provided outside the sensing area; an extension area that is provided in the vicinity of the sensing area and in which the extension lines are arranged densely; detection means for obtaining a data signal in all the coordinates in the sensing area when an area in a predetermined range adjacent to the extension area within the sensing area is assumed to be a non-sensing area and the area other than the non-sensing area is assumed to be an operating area; determination means for determining as to from which one of the non-sensing area and the operating area the detected data signal is output; and coordinate specification means for specifying the coordinate position of the body to be detected by using the data signal when it is determined that the data signal is output from the operating area.

In the present invention, the sensing area is separated into a non-sensing area adjacent to the extension area and an operating area other than the non-sensing area by using software. The data signal detected from the non-sensing area is ignored, and only the data signal detected from the operating area is used as basis data for inputting a coordinate. Thus, influences received from the extension area can be decreased, and coordinate detection having a high accuracy can be implemented.

In another aspect, the present invention provides an electrostatic detection apparatus for detecting a coordinate position by using a programmed computer, the electrostatic detection apparatus including: a sensing area to which a body to be detected contacts or approaches; a plurality of sensor electrodes in which an electrostatic capacitance is formed as a coordinate in a sensing area and that output the position of the body to be detected as a data signal indicating the change of the electrostatic capacitance; detection means for obtaining a data signal in all coordinates in the sensing area when a boundary line formed from a predetermined shape is virtually formed in the sensing area, and one of the inside and the outside of the boundary line is assumed to be a non-sensing area and the other is assumed to be an operating area; determination means for determining as to from which one of the non-sensing area and the operating area the data signal is output; and coordinate specification means for specifying the coordinate position of the body to be detected by using the data signal when it is determined that the data signal is output from the operating area.

In the present invention, various operation keys including, for example, a cross key, can be used in response to an operation mode. Thus, it is possible to provide an electrostatic detection apparatus having high ease of operation and high flexibility.

The electrostatic detection apparatus may further include area setting means for dividing the sensing area into a non-sensing area and an operating area.

More specifically, the area setting means can be configured using software. The area setting means in this case, together with other means (determination means and coordinate specification means), may be stored in storage means (RAM, etc.) of the electrostatic detection apparatus. Alternatively, when the electrostatic detection apparatus is installed into a main unit (for example, a control apparatus, such as a PC) of a higher level than the electrostatic detection apparatus, only the area setting means may be incorporated inside driver software for mediating between the electrostatic detection apparatus and the main apparatus.

Preferably, a plurality of patterns are provided as the predetermined shape, and one pattern can be selected from the plurality of patterns.

In the above-described means, operation keys of various shapes can be realized.

For example, the sensor electrodes may be such that a plurality of X electrodes that extend in the X direction and that are arranged at a predetermined spacing in the Y direction, and a plurality of Y electrodes that extend in the Y direction and that are arranged at a predetermined spacing in the X direction are arranged so as to oppose each other in a matrix in such a manner as to intersect at right angles to each other.

In another aspect, the present invention provides a method of detecting a coordinate position for use with an electrostatic detection apparatus by using a programmed computer, the method including the steps of: forming an electrostatic capacitance as a coordinate in a sensing area and detecting the position of a body to be detected as a data signal indicating the change of the electrostatic capacitance when the body to be detected contacts or approaches the sensing area provided in the electrostatic detection apparatus; dividing the sensing area into a non-sensing area and an operating area; determining as to from which one of the non-sensing area and the operating area the detected data signal is output; and specifying the coordinate position of the body to be detected by using the data signal when it is determined that the data signal is output from the operating area.

In another aspect, the present invention provides a program for detecting a coordinate for use with an electrostatic detection apparatus, the program allowing a computer to function as: detection means for forming an electrostatic capacitance as a coordinate in a sensing area and detecting the position of a body to be detected as a data signal indicating the change of the electrostatic capacitance when the body to be detected contacts or approaches the sensing area provided in the electrostatic detection apparatus; determination means for determining as to from which one of a non-sensing area and an operating area the detected data signal is output when a predetermined area within the sensing area is set as a non-sensing area and the other area is set as an operating area; and coordinate specification means for specifying the coordinate position of the body to be detected by using the data signal when it is determined that the data signal is output from the operating area.

The program for detecting a coordinate may further include area setting means for dividing the sensing area into a non-sensing area and an operating area.

DESCRIPTION OF THE PREFERRED EMBODIMENTS

First to third embodiments of the present invention will now be described below.

Figure 1:
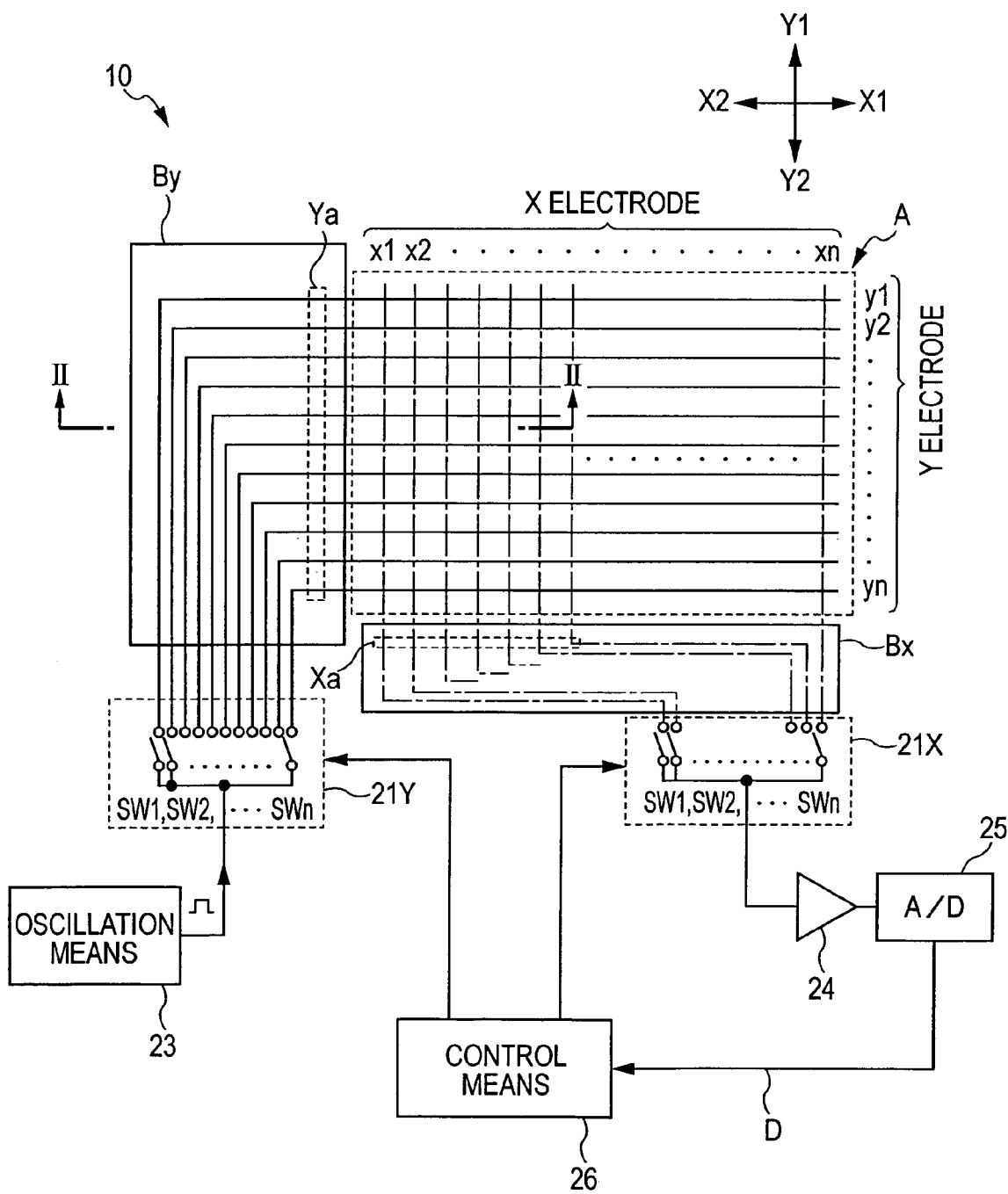
FIG. 1 is a schematic diagram showing an electrostatic detection apparatus according to a first embodiment of the present invention.
Figure 2:
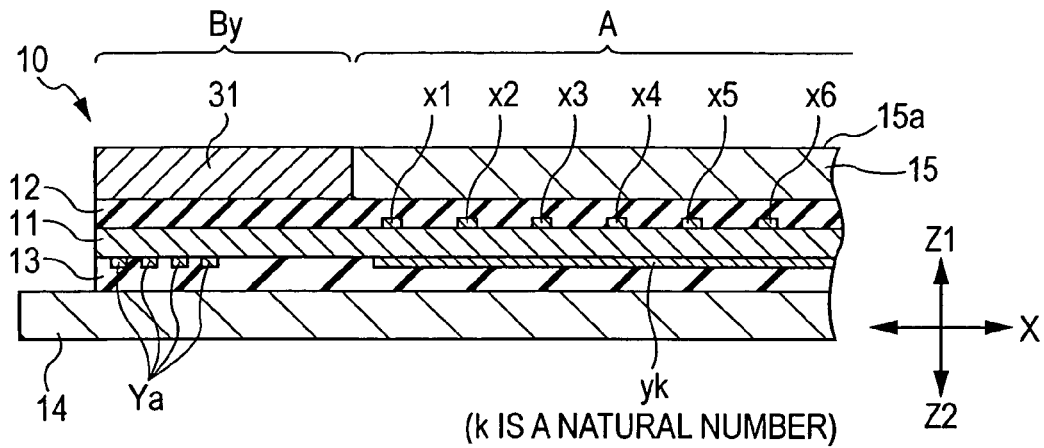
FIG. 2 is a sectional view taken along the line II-II of FIG. 1 according to the first embodiment of the present invention.
Figure 3:
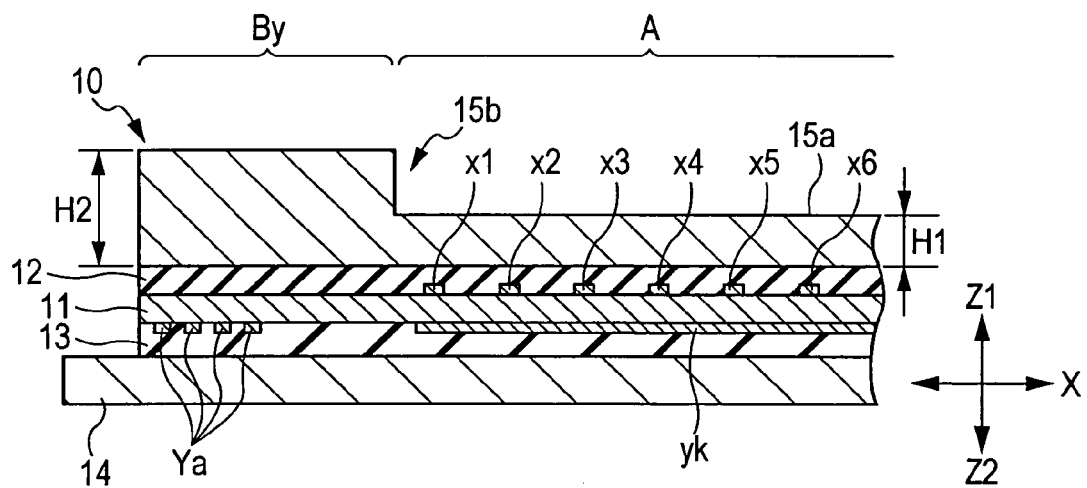
FIG. 3 is a sectional view taken along the line II-II of FIG. 1 according to a second embodiment of the present invention.
Figure 4:
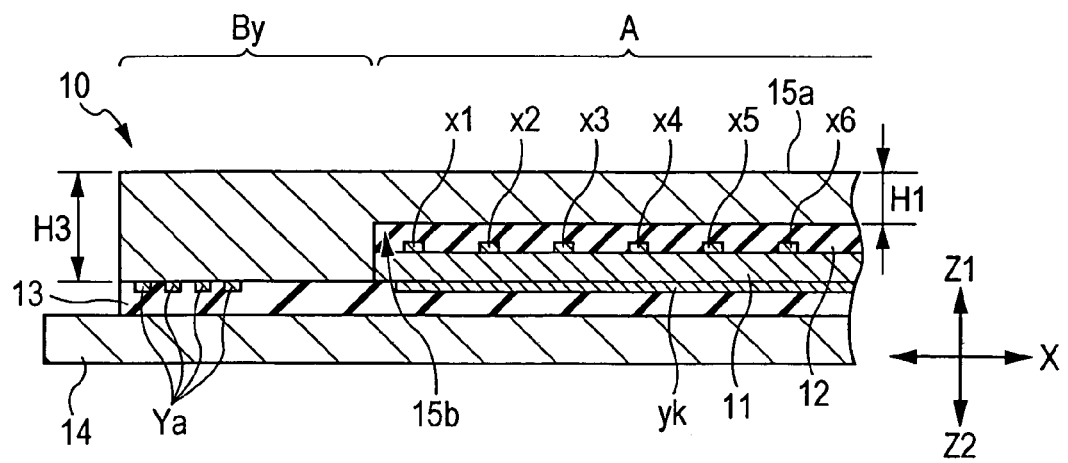
FIG. 4 is a sectional view taken along the line II-II of FIG. 1 according to a third embodiment of the present invention.

FIG. 1 is a schematic diagram showing an electrostatic detection apparatus according to a first embodiment of the present invention. FIG. 2 is a sectional view taken along the line II-II of FIG. 1 according to the first embodiment of the present invention. FIG. 3 is a sectional view similar to FIG. 2, taken along the line II-II of FIG. 1 according to a second embodiment of the present invention. FIG. 4 is a sectional view similar to FIG. 2, taken along the line II-II of FIG. 1 according to a third embodiment of the present invention.

As shown in FIG. 1, an electrostatic detection apparatus 10 has a plurality of X electrodes (sensor electrodes) x1, x2, ..., xn that extend in the Y direction and that are arranged at a predetermined spacing in the X direction, and a plurality of Y electrodes (sensor electrodes) y1, y2, ..., yn that extend in the X direction and that are arranged at a predetermined spacing in the Y direction.

As shown in FIG. 2, the plurality of X electrodes x1, x2, ..., xn are provided on one of the surfaces (the obverse surface) of a dielectric sheet 11, and the plurality of Y electrodes y1, y2, ..., yn are provided on the other surface (the rear surface) of the dielectric sheet 11. That is, the plurality of X electrodes x1, x2, ..., xn and the plurality of Y electrodes y1, y2, ..., yn are arranged in a matrix so as to oppose each other to intersect at right angles to each other via the dielectric sheet 11. As a result, electrostatic capacitances C are formed between the plurality of X electrodes x1, x2, ..., xn and the plurality of Y electrodes y1, y2, ..., yn.

On one of the surfaces of the dielectric sheet 11, an insulating film 12 that covers the plurality of X electrodes x1, x2, ..., xn is formed. Similarly, on the other surface of the dielectric sheet 11, an insulating film 13 that covers the plurality of Y electrodes y1, y2, ..., yn is formed. Then, a cover sheet 15 is fixed to the top layer of the insulating film 12, and a substrate 14 is fixed to the under layer of the insulating film 13. The fixation between the insulating film 12 and the cover sheet 15 and the fixation between the insulating film 13 and the substrate 14 are performed by using a bonding agent. Alternatively, the insulating film 12 and 13 themselves may also be a bonding agent.

The surface (the surface on the Z1 side) of the cover sheet 15, which is formed from, for example, a polyester resin, is an operation surface 15a on which a body to be detected such as a finger contacts and slides. The plurality of X electrodes x1, x2, ..., xn and the plurality of Y electrodes y1, y2, ..., yn are arranged in a matrix at positions on the bottom side of the operation surface 15a, and, as shown in FIG. 1, the portion where the cover sheet 15 is provided is set as a sensing area A of the electrostatic detection apparatus.

As shown in FIG. 1, each of the end portions of the plurality of X electrodes x1, x2, ..., xn extends as an extension line Xa from the sensing area A to outside the Y2 side (shown in the figure). The extension lines Xa are densely arranged in an extension area Bx provided adjacent to the sensing area A, and are connected to switching means 21X formed by, for example, a multiplexer via the extension area Bx.

Similarly, each of the end portions of the plurality of Y electrodes y1, y2, ..., yn extend as an extension line Ya from the sensing area A to outside the X2 side (shown in the figure), and are connected to switching means 21Y via an extension area By.

Oscillation means 23 is connected to the switching means 21Y at one side, so that a predetermined voltage can be selectively applied from the oscillation means 23 to the Y electrodes y1, y2, ..., yn. Furthermore, amplifier means 24 is connected to the switching means 21X at the other side, so that the output thereof is connected to control means 26 via an A/D conversion means 25.

The control means 26, which is formed mainly by a CPU, can not only obtain data from the A/D conversion means 25, but can also set, for example, the timing of switching the switching means 21X and 21Y.

The amplifier means 24 has a function for amplifying the voltage that appears in the switching means 21X at a predetermined gain. The A/D conversion means 25 has a function for converting the amplified voltage (analog value) into a digital value at a predetermined sampling period. Filter means for removing unwanted noise may be provided between the amplifier means 24 and the A/D conversion means 25.

The operation of the electrostatic detection apparatus is described below.

The control means 26 allows the switching means 21Y and the switching means 21X to operate so as to turn on the switch SW1 of the switching means 21Y and thereafter, sequentially turns on the switches SW1 to SWn on the switching means 21X side.

When a predetermined voltage is input from the oscillation means 23 to the Y electrodes y1, y2, ..., yn, a dielectric flux is generated between each of the Y electrodes y1, y2, ..., yn and each of the X electrodes x1, x2, ..., xn arranged in a matrix in such a manner as to oppose each other, and an electrostatic capacitance C is formed correspondingly. Therefore, a voltage is applied to the X electrodes x1, x2, ..., xn via the individual electrostatic capacitances C.

Here, when the body to be detected, such as a finger, contacts or approaches any desired position on the operation surface 15a of the cover sheet 15, some of the dielectric fluxes are extracted by the body to be detected, and the electrostatic capacitance positioned in the vicinity of the body to be detected is decreased. As a result, since some of the electrostatic capacitances C are changed, a voltage corresponding to the amount of that change is detected from the X electrodes x1, x2, . . . , xn. The voltage value detected at this time is such that the nearer the distance from the body to be detected, the higher the voltage value is detected, and the farther the distance, the lower the voltage value is detected.

The voltage output from each of the X electrodes x1, x2, . . . , xn is input to the A/D conversion means 25 after passing through the amplifier means 24, and is converted into digital data D by the A/D conversion means 25. Thereafter, the data is sent to the control means 26. Then, the control means 26 determines, on the basis of the data D, the position of the body to be detected in the X direction on the Y electrode y1.

Then, the control means 26 sequentially turns on the switch SW2 to SWn of the switching means 21Y, and similarly to that described above, sequentially turns on the switches SW1 to SWn on the switching means 21X side for each switch SW of the switching means 21Y, thereby obtaining digital data D at each intersection between the Y electrodes y1, y2, . . . , yn and the X electrodes x1, x2, . . . , xn. Then, the control means 26 determines the coordinate position (coordinate data) of the body to be detected on the basis of these pieces of the data D.

Here, in the electrostatic detection apparatus shown in the first embodiment of FIG. 2, a shielding member 31 serving as electrostatic protection means is provided in the extension area By adjacent to the sensing area A. The shielding member 31 is formed from a metal plate made of a magnetic material and is fixed to the surface of the extension area By in such a manner as to cover the extension lines Ya.

The shielding member 31 is preferably configured to cover at least the vicinity of the sensing area A to which the body to be detected easily contacts, and more preferably covers the full length in which the extension lines Ya, which are end portions of the Y electrodes y1, y2, . . . , yn, are connected from the position outside the sensing area A to the switching means 21Y. It is preferable that the shielding member 31 be grounded in that still superior advantages can be expected.

As described above, as a result of covering the extension lines Ya using the shielding member 31, when the body to be detected approaches the extension area, a dielectric flux is not generated between the body to be detected and the extension lines Ya wired in the extension area By, thereby preventing an electrostatic capacitance from being generated between them. Furthermore, even if an electrostatic capacitance is formed between the body to be detected and each extension line Ya, it is possible to reduce at least the amount of the change of the electrostatic capacitance with respect to the movement of the body to be detected.

For this reason, the voltage generated in the extension area By does not coexist in the coordinate data detected in the sensing area A, that is, in the coordinate data detected by the X electrodes x1, x2, . . . , xn and the Y electrodes y1, y2, . . . , yn. Furthermore, even if the voltage coexists, the value can be made to be very small. Thus, the accuracy of detecting the coordinate data can be improved.

Next, a second embodiment of the present invention will be described below with reference to FIG. 3.

The configuration of the electrostatic detection apparatus 10 shown in FIG. 3 is substantially the same as the configuration of the first embodiment. However, the electrostatic protection means provided in the extension area By differs from the shielding member 31.

When compared to the first embodiment, in the second embodiment, as a result of forming the plate thickness dimension H2 of the portion corresponding to the extension area By within the cover sheet 15 thicker than the plate thickness dimension H1 of the operation surface 15a, a step difference 15b is provided between them. H2 should preferably be 3 mm or more.

As described above, as a result of forming the plate thickness dimension H2 of the extension area By thicker than the other portion (the operation surface 15a), even when the body to be detected approaches or contacts the extension area By, similarly to that described above, it is possible to prevent an electrostatic capacitance from being formed between the body to be detected and the extension lines Ya positioned in the lower portion of the extension area By. Alternatively, even if an electrostatic capacitance is formed between the body to be detected and each extension line Ya, it is possible to reduce at least the amount of the change of the electrostatic capacitance with respect to the movement of the body to be detected.

In the second embodiment, the plate thickness dimensions of the portion of the operation surface 15a corresponding to the sensing area A and the portion corresponding to the extension area By within the cover sheet 15 need only to be changed, and the cover sheet 15 can be integrally molded using the same member. Thus, it is possible to reduce the manufacturing cost without increasing the number of parts.

Furthermore, since the sensing area and the extension area can be clearly distinguished from each other, it becomes possible for the operator to improve the ease of operation of the electrostatic detection apparatus 10.

A third embodiment of the present invention shown in FIG. 4 is a modification of the second embodiment.

In the second embodiment, a step difference is formed by making the plate thickness dimension H2 of the portion opposing the extension area By of the cover sheet 15 thicker from the bottom surface of the cover sheet 15 toward the outward direction (in the Z1 direction shown in the figure). However, the difference of the third embodiment from the second embodiment is that a step difference 15b is formed by making the plate thickness dimension H3 thicker from the top surface of the cover sheet 15 toward the inward direction (in the Z2 direction shown in the figure). H3 should preferably be 3 mm or more.

In the electrostatic detection apparatus 10 shown in FIG. 4, the advantages possessed by the second embodiment are offered, and also, the surface of the cover sheet 15 can be made flat. Therefore, unwanted irregularities do not appear when the electrostatic detection apparatus 10 is installed in an electronic apparatus, such as a computer, and the overall exterior design of the electronic apparatus can be made aesthetically pleasing.

In this case, the sensing area and the extension area cannot be clearly distinguished from each other. However, this can be dealt with by changing the color of the sensing area and the extension area or by forming a groove (recessed part) or a rib (projection part), which serves as the boundary between the sensing area and the extension area, on the surface of the cover sheet 15.

In the above-described second and third embodiments, an example in which the step difference 15b is formed on one of the obverse surface and the rear surface of the cover sheet 15 has been described. The present invention is not limited to this example. A step difference may also be formed on both sides of the cover sheet 15. In this case, since the plate thickness dimension of the extension area By can be made further thicker, the amount of the change of the electrostatic capacitance with respect to the body to be detected can be further reduced.

In each of the above-described embodiments, the extension area By at one side has been described. The same applies to the extension area Bx at the other side.

Next, fourth to sixth embodiments of the present invention will be described below.

Figure 5:
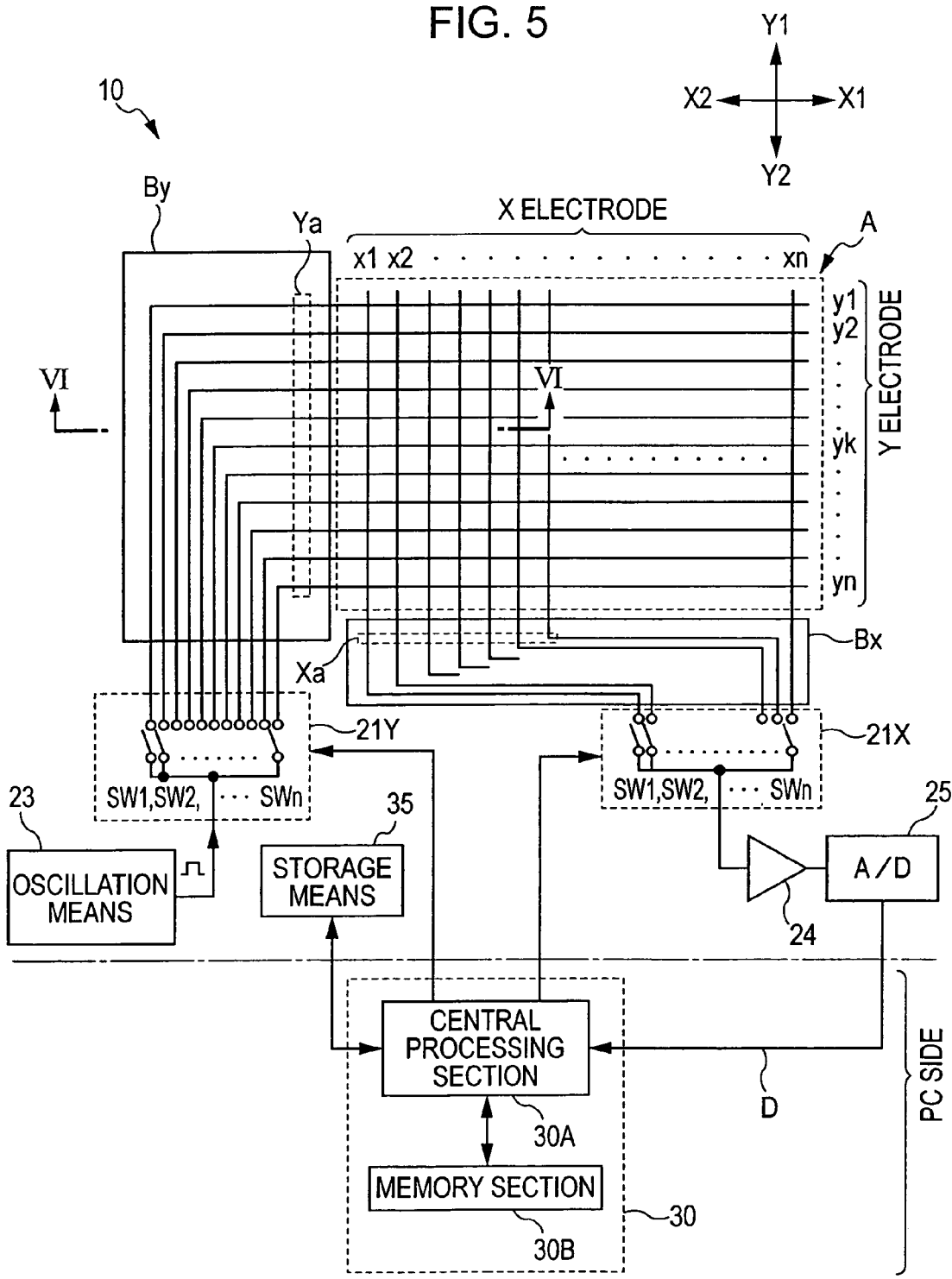
FIG. 5 is a schematic diagram showing an electrostatic detection apparatus according to a fourth of the present invention.
Figure 6:
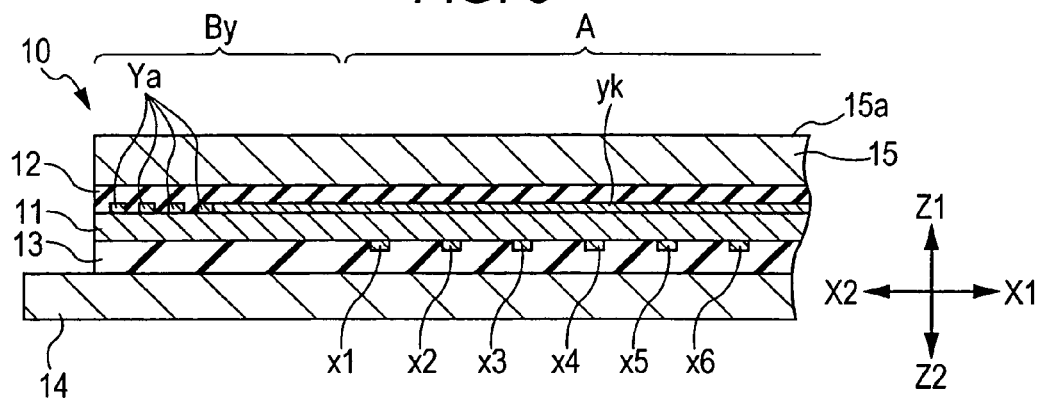
FIG. 6 is a sectional view taken along the line II-II of FIG. 4.
Figure 7:
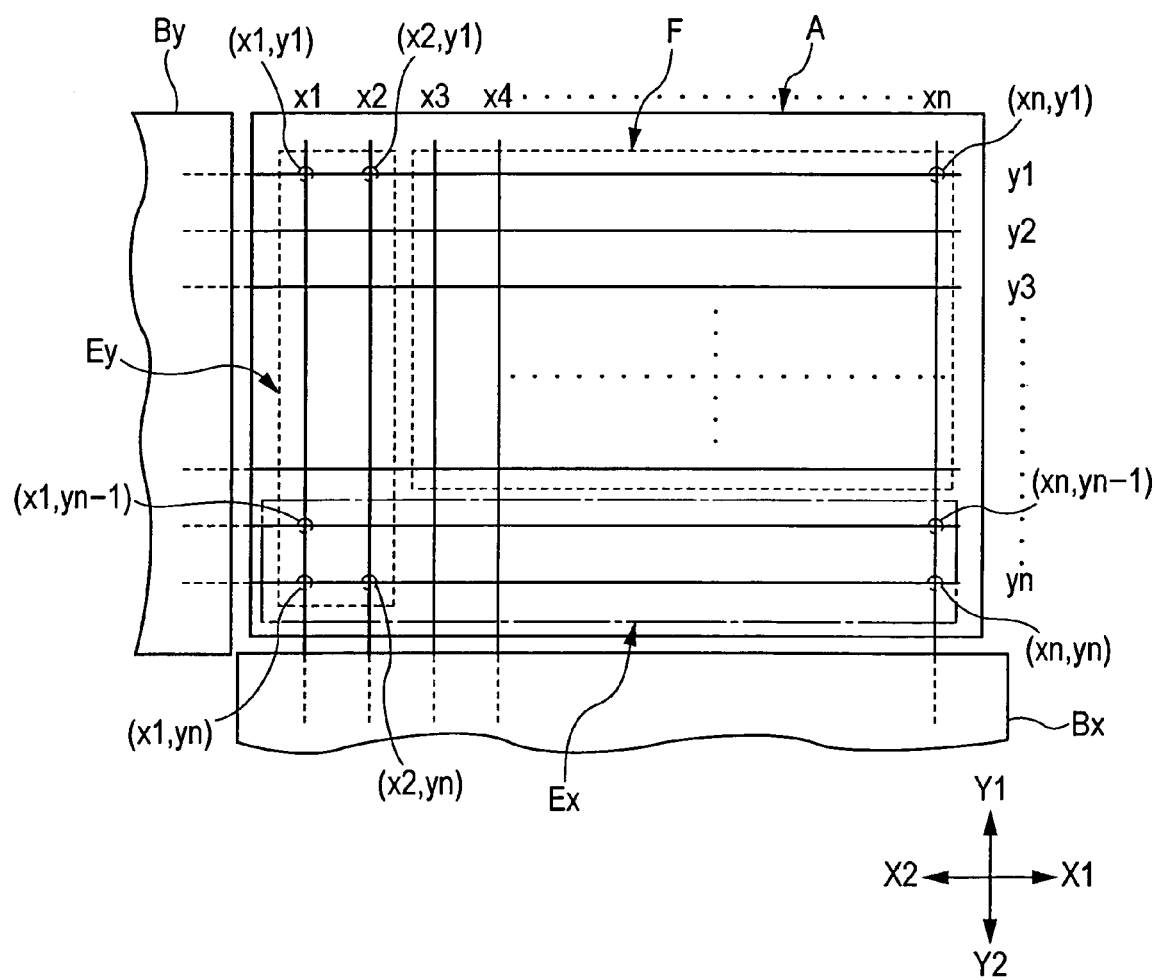
FIG. 7 is a schematic diagram similar to FIG. 5 showing an operation surface of a cover sheet and an enlarged sensing area.
Figure 8:
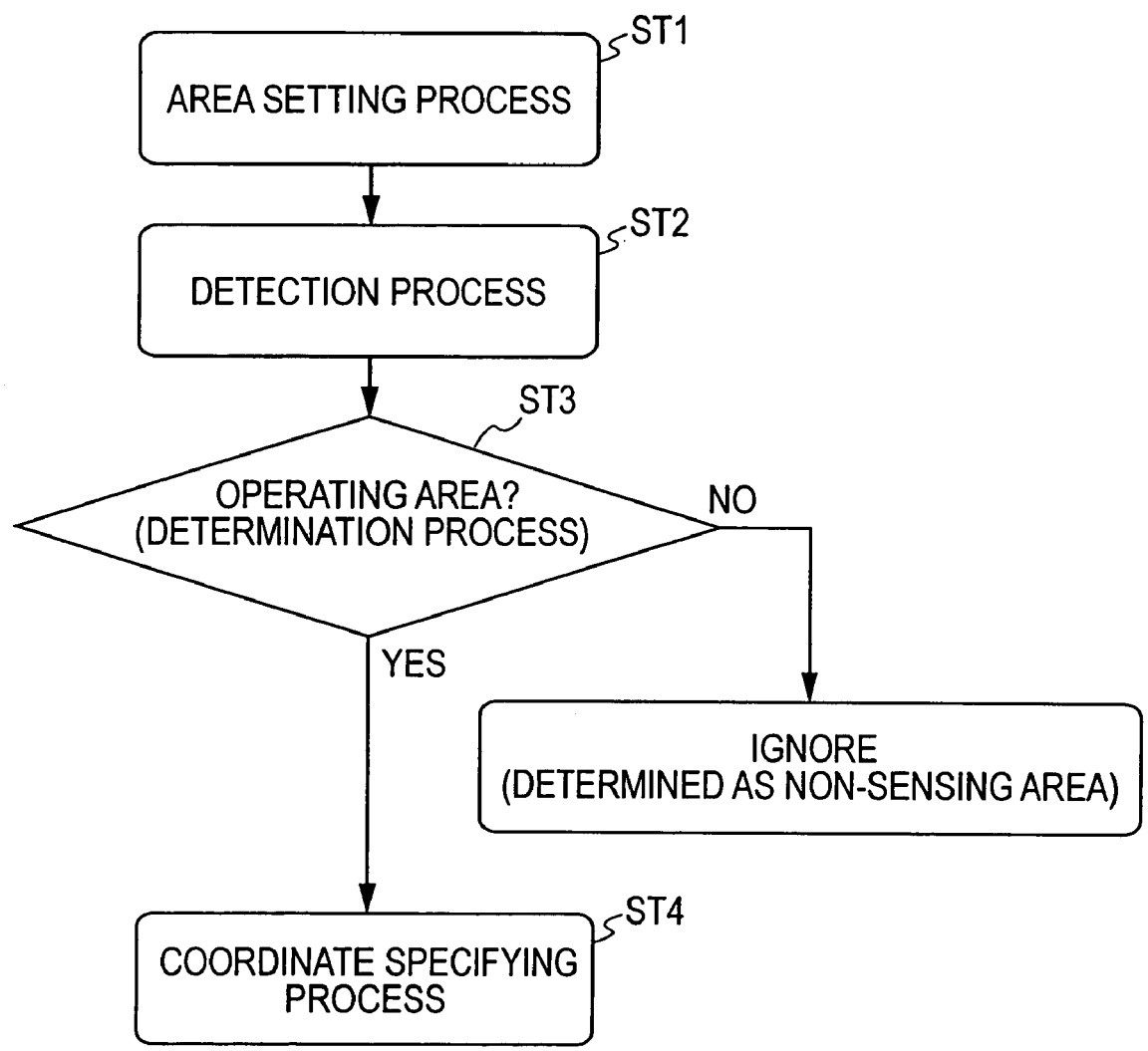
FIG. 8 is a flowchart showing the operation of an electrostatic detection apparatus.

FIG. 5 is a schematic diagram showing an electrostatic detection apparatus according to a fourth of the present invention. FIG. 6 is a sectional view taken along the line II-II of FIG. 5. FIG. 7 is a schematic diagram similar to FIG. 5, showing an operation surface of a cover sheet and an enlarged sensing area. FIG. 8 is a flowchart showing the operation of an electrostatic detection apparatus. Components in FIGS. 5 to 8, which are identical to those shown in the first embodiment, are designated with the same reference numerals.

As shown in FIGS. 5 and 6, the area surrounded by four electrode lines positioned on both ends in the X-Y plane within the portion opposing the cover sheet 15, that is, an X electrode x1, an electrode Xn, a Y electrode y1, and a Y electrode yn, is set as a sensing area A of the electrostatic detection apparatus 10.

As shown in FIG. 5, the end portions of the plurality of X electrodes x1, x2, . . . , xn have the extension lines Xa, each of which extends from the sensing area A to the outside of the Y2 side (shown in the figure). The extension lines Xa are densely wired in the extension area Bx adjacent to the sensing area A, and are connected to switching means 21X, which is formed by, for example, a multiplexer, via the extension area Bx. Similarly, the end portions of the plurality of Y electrodes y1, y2, . . . , yn, each of which serves as an extension line Ya, are densely wired in the extension area By adjacent to the sensing area A, and are connected to externally provided switching means 21Y via the extension area By.

Oscillation means 23 is connected to the switching means 21Y at one side, so that a predetermined voltage can be selectively applied from the oscillation means 23 to the Y electrodes y1, y2, . . . , yn. Furthermore, amplifier means 24 is connected to the switching means 21X at the other side, and the output thereof is connected to a computer 30 (a control apparatus, such as a PC) on the main apparatus side provided outside the electrostatic detection apparatus 10 via an A/D conversion means 25.

Furthermore, the electrostatic detection apparatus 10 has storage means 35 formed of, for example, a RAM, with driver software for mediating between the electrostatic detection apparatus 10 and the computer 30 being stored in the storage means 35. Examples of the driver software include various kinds of program modules for an area setting process, a determination process, and a position specifying process in addition to a detection process for driving the electrostatic detection apparatus 10 in order to obtain a data signal, as will be described later.

The driver software may be structured in such a way that all the driver software is installed into a memory section 30B of the computer 30 or the driver software for only the area setting process is installed into the memory section 30B, as will be described later.

The computer 30 mainly includes a central processing section 30A formed of a CPU, and the memory section 30B. The central processing section 30A can not only obtain a data signal output from the A/D conversion means 25 of the electrostatic detection apparatus 10, but can also set, for example, the timing of switching the switching means 21X and 21Y. The oscillation means 23 is preferably driven in accordance with a clock signal output from the computer 30 side. In the memory section 30B, in addition to the OS (Operating System), various kinds of application software, and various kinds of program modules (an area setting process, a detection process, a determination process, a position specifying process, etc.) for allowing the central processing section 30A to operate in accordance with a predetermined processing procedure (algorithm) are stored.

The amplifier means 24 has a function for amplifying the voltage that appears in the switching means 21X at a predetermined gain. Furthermore, the A/D conversion means 25 has a function for converting the amplified voltage (analog value) into a digital value at a predetermined sampling period. Filter means for removing unwanted noise may be provided between the amplifier means 24 and the A/D conversion means 25.

The operation of the electrostatic detection apparatus 10 is described below.

The detection of the coordinate position in the electrostatic detection apparatus 10 is performed by the central processing section 30A performing a detection process in accordance with an algorithm written in a program stored in the memory section 30B. That is, the central processing section 30A allows the switching means 21Y and the switching means 21X to operate so that the switch SW1 of the switching means 21Y is turned on and in this state, the switches on the switching means 21X side are sequentially turned on from the switch SW1 to the switch SWn.

When a pulse signal formed of a predetermined voltage is input from the oscillation means 23 to the Y electrode y1 at a frequency in accordance with the timing of switching from the switch SW1 to the switch SWn on the switching means 21X side, a dielectric flux is sequentially generated between each Y electrode y1 and each of the X electrodes x1, x2, . . . , xn arranged in a matrix in such a manner as to oppose each Y electrode y1, and the electrostatic capacitance C is sequentially formed between the electrodes. As a result, a voltage is sequentially applied to the X electrodes x1, x2, . . . , xn side via the electrostatic capacitances C that are generated sequentially.

Similarly, the switching means 21Y is switched to a state in which the switch SW2 is turned on, and in this state, the switches on the switching means 21X side are sequentially switched from the switch SW1 to the switch SWn. Next, the switching means 21Y is switched to a state in which the switch SW3 is turned on, and in this state, the switches on the switching means 21X side are sequentially switched from the switch SW1 to the switch SWn. As described above, in the detection process, each time the switches of the switching means 21Y are switched in accordance with instructions of the central processing section 30A, the operation of sequentially switching the switches on the switching means 21X side from the switch SW1 to the switch SWn is repeated. Therefore, as a result of a voltage being applied at a predetermined frequency to a portion where the X electrodes x1, x2, . . . , xn and the Y electrodes y1, y2, . . . , yn arranged in a matrix intersect, the electrostatic capacitance C is formed at the predetermined frequency in the intersection portion.

Here, when the body to be detected such as a finger is made to contact or approach any desired position on the operation surface 15a of the cover sheet 15, some of the dielectric fluxes are extracted from the X electrode to which the body to be detected approached to the body to be detected, and the electrostatic capacitance positioned in the vicinity of the body to be detected is decreased. For this reason, since the magnitude of the electrostatic capacitance C formed sequentially in a matrix changes partially, a voltage corresponding to the amount of the change thereof is detected from the X electrodes x1, x2, . . . , xn corresponding to the body to be detected is detected. The voltage value detected at this time is such that the nearer the distance from the body to be detected, the lower from the fixed voltage value the voltage value is detected, and the farther the distance, it is detected as the fixed voltage.

Each voltage that appears in each of the X electrodes x1, x2, . . . , xn is input to the amplifier means 24 in accordance with the timing of switching from the switch SW1 to the switch SWn of the switching means 21X. In the amplifier means 24, the voltage is amplified at a predetermined gain, and thereafter is input to the A/D conversion means 25. The A/D conversion means 25 converts each voltage after being amplified at least at a conversion frequency higher than the switching frequency of the switching means 21X, into a digital data signal D, and thereafter sends the data signal D to the central processing section 30A. Then, it is possible for the central processing section 30A to determine the coordinate position (the position on the X-Y plane) of the body to be detected positioned on the operation surface 15a by analyzing the data signal D that is sequentially sent from the A/D conversion means 25.

As described above, a plurality of extension lines Ya that extend to the extension area By are connected to the Y electrode. Therefore, when the body to be detected such as a finger is made to approach the extension area By, there are cases in which the electrostatic capacitance C is formed by the X electrodes (for example, the X electrodes x1 and x2) arranged at positions adjacent to the extension area By within the sensing area A and by one of the extension lines Ya to which the body to be detected approached. For this reason, there is the following risk that, in spite of the fact that the body to be detected is made to contact the extension area By other than the sensing area A, an error data signal indicating as if the body to be detected contacted the sensing area A (positions corresponding to the X electrodes x1 and x2) is detected, and the coordinate position information generated in accordance with the error data signal is output from the central processing section 30A.

Therefore, in the present invention, the central processing section 30A ignores the data signal D obtained from the X electrodes, for example, the X electrodes x1 and x2, provided within a fixed range from the extension area By and does not use the data signal D as basis data for detecting the coordinate position.

That is, the central processing section 30A does not perform the above-described detection process at first, but performs an area setting process (ST1), thereafter performs a detection process (ST2), a determination process (ST3), and a coordinate specifying process (ST4), as shown in FIG. 8.

The area setting process (ST1) is described first. As shown in FIG. 7, the range of all the coordinates that oppose the operation surface 15a of the cover sheet 15 and that are surrounded by the coordinate (x1, y1), the coordinate (xn, y1), the coordinate (xn, yn), and the coordinate (x1, yn) is assumed to be a sensing area A, and the X electrodes within a fixed range of the sensing area A from the extension area By in the X1 direction (shown in the figure) are assumed to be, for example, X electrodes x1 and x2. In a similar manner, the Y electrodes within a fixed range of the sensing area A from the extension area Bx in the Y1 direction (shown in the figure) are assumed to be, for example, Y electrodes y(n-1) and yn.

In ST1, as shown in FIG. 7, first, the central processing section 30A sets the area surrounded by the coordinate (x1, y1), the coordinate (x2, y1), the coordinate (x2, yn), and the coordinate (x1, y1) indicated by the dotted line, as a non-sensing area Ey, in the vicinity of the extension area By within the sensing area A. In a similar manner, the central processing section 30A sets the area surrounded by the coordinate (x1, y(n-1)), the coordinate (xn, y(n-1)), the coordinate (x1, yn), and the coordinate (x1, yn) indicated by one dotted line, as a non-sensing area Ex, in the vicinity of the extension area Bx within the sensing area A (the area setting process).

Next, the central processing section 30A performs the above-described detection process in order to obtain, at a predetermined sampling frequency, the data signal D corresponding to all the coordinates (the X electrodes x1, x2, . . . , xn and the Y electrodes y1, y2, . . . , yn) within the sensing area A (the detection process).

In ST3, it is determined as to from which of the non-sensing area Ey or Ex, and an operating area F the data signal D is detected in the detection process (the determination process).

Then, in ST4, only when the data signal D detected in ST2 is the data signal D detected from within the operating area F, the data signal D is used as the basis data for specifying the coordinate position in order to specify the coordinate position of the body to be detected (the coordinate specifying process).

As described above, in the present invention, the data signal D detected from the non-sensing areas Ey and Ex having a high possibility of containing an error data signal is not used, and only the data signal D detected from the operating area F having a low possibility of containing an error data signal is used. Thus, it is possible to specify a coordinate position with a high accuracy with respect to the body to be detected.

Figure 9:
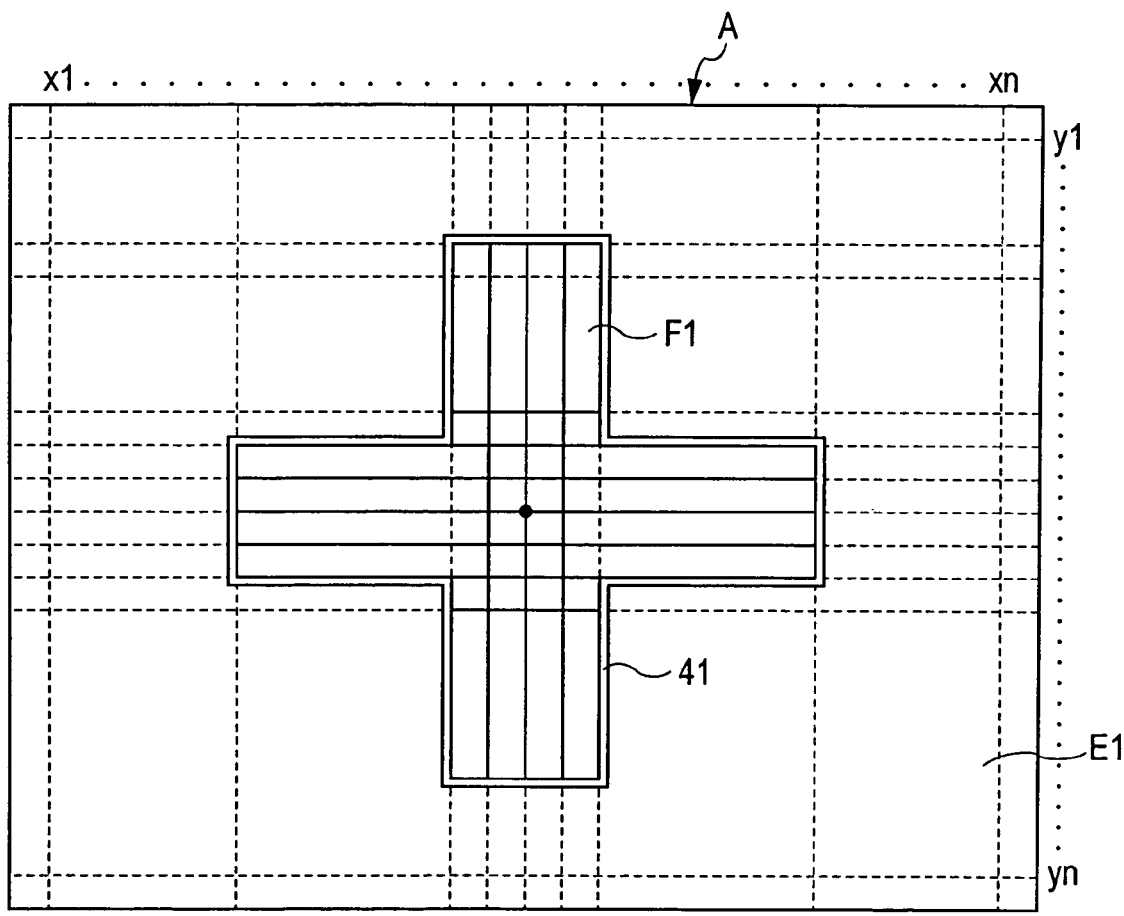
FIG. 9 is a schematic diagram similar to FIG. 7 showing an operation surface of a cover sheet according to a fifth of the present invention.

FIG. 9 is a schematic diagram similar to FIG. 7 showing an operation surface of a cover sheet according to a fifth embodiment of the present invention.

In FIG. 9, a state is virtually shown in which a cross-shaped operation key (cross key) is formed on the operation surface 15a of the cover sheet 15.

For example, when the operation mode that uses the cross key is selected by the user while game software is being performed in a main apparatus (PC (Personal Computer) or the like) having incorporated therein the electrostatic detection apparatus 10 according to the present invention, in the computer 30, a program for a cross key from among a plurality of programs stored in the memory section 30B is loaded into the central processing section 30A, and is executed.

The operation of the electrostatic detection apparatus described in the second embodiment is identical to that of the first embodiment. That is, the central processing section 30A executes a program for a cross key, as shown in ST1 of FIG. 8, in order to virtually form a cross-shaped boundary line 41 indicated by a double line in FIG. 9. Then, the central processing section 30A sets the inside of the boundary line 41 as an operating area F1 in accordance with the program in order to set the outside of the boundary line 41 as a non-sensing area E1 (the area setting process). The program may set the inside of the boundary line 41 as a non-sensing area E1 and may set the outside of the boundary line 41 as an operating area F1.

Next, as shown in ST2 of FIG. 8, the central processing section 30A obtains the data signal D corresponding to all the coordinates within the sensing area A at a predetermined sampling frequency (the detection process). Then, as shown in ST3, it is determined as to from which of the non-sensing area E1 and the operating area F1 the detected data signal D is detected (the determination process). When it is determined in ST4 that the data signal D is detected from the non-sensing area E1, the data signal D is not used as the basis data for specifying a coordinate position. Only when it is determined that the data signal D is detected from the operating area F1, the data signal D is used as the basis data for specifying a coordinate position in order to specify the coordinate position of the body to be detected (the coordinate specifying process).

Therefore, the operator can operate the operation surface 15a of the cover sheet 15 as a cross key. Thus, it is possible to provide the electrostatic detection apparatus 10 having high ease of operation and high flexibility.

If a cross-shaped mark is printed, etc., on the operation surface 15a of the cover sheet 15 at a position corresponding to the operating area F1, it is possible to allow the operator to visually recognize the position at which the operation surface operates as a cross key.

Figure 10:
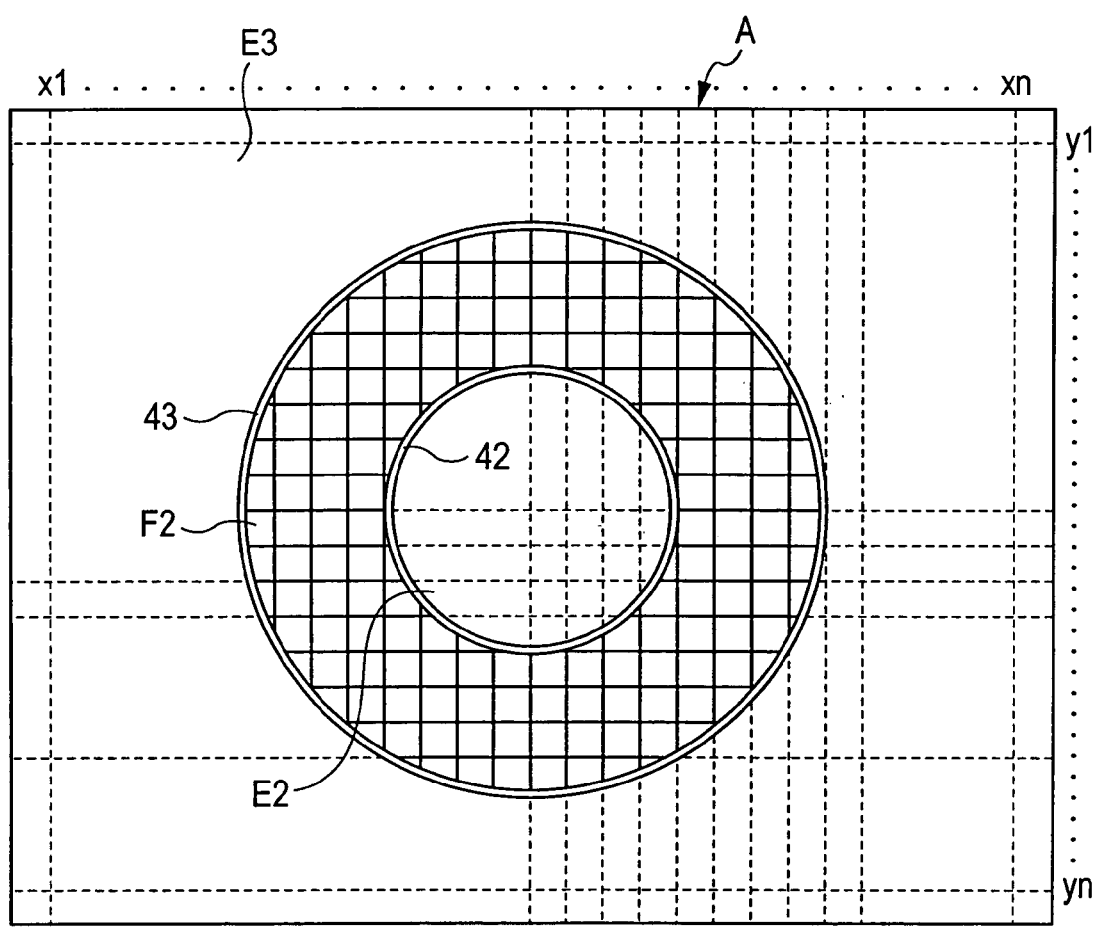
FIG. 10 is a schematic diagram similar to FIG. 7 showing an operation surface of a cover sheet according to a sixth of the present invention.

FIG. 10 is a schematic diagram similar to FIG. 7 showing an operation surface of a cover sheet according to a sixth embodiment of the present invention.

In the sixth embodiment shown in FIG. 10, a state is shown virtually in which a ring-shaped operation key (ring key) is formed on the operation surface 15a of the cover sheet 15, that is, within the sensing area A.

Also, in this case, a program exclusively used for a ring key from among a plurality of programs stored in the memory section 30B inside the computer 30 is loaded into the central processing section 30A and is executed. That is, as shown in FIG. 10, the central processing section 30A virtually forms, in the sensing area A, an inside boundary line 42 and an outside boundary line 43, which are indicated by two types of double lines having different diameter dimensions. Then, in accordance with the program, the central processing section 30A sets the area sandwiched by the inside boundary line 42 and the outside boundary line 43 as an operating area F2, and sets the inside of the inside boundary line 42 and the outside of the outside boundary line 43 as non-sensing areas E2 and E3, respectively (ST1: the area setting process).

Next, the central processing section 30A obtains the data signal D corresponding to all the coordinates within the sensing area A at a predetermined sampling frequency (ST2: the detection process), determines as to from which of the non-sensing area E2 or E3, and the operating area F2 the detected data signal D is output (ST3: the determination process), and specifies the coordinate position of the body to be detected by not using the data signal D as basis data for specifying the coordinate position when the data signal D is output from the non-sensing area E2 or E3 and by using the data signal data D as basis data for specifying the coordinate position only when it is output from the operating area F2 (ST4: the coordinate specifying process). Therefore, the operator can operate the operation surface 15a of the cover sheet 15 as a ring key. Thus, it is possible to provide the electrostatic detection apparatus 10 having high ease of operation and high flexibility.

In the above-described embodiments, a case in which the operation key is a cross key or a ring key has been described. However, the present invention is not limited to this example. In addition, for example, operation keys having various shapes, such as a bar-shaped operation key that extends in a straight-line manner in the X or Y direction or a star-shaped operation key, can be used. That is, a plurality of programs conforming to pattern shapes of various kinds of operation keys are stored in the memory section 30B of the computer 30, so that a program for one pattern is selected therefrom and is executed.

The selection of the operation keys can be performed, for example, as one process within the software (for example, game software) being executed, and the execution of the operation key can be performed in accordance with the program. Therefore, the operator can dynamically set the operation key in accordance with the display content displayed on a monitor display section of a PC.

What is claimed is:

1. An electrostatic detection apparatus comprising:
 a sensing area for detecting that a body to be detected contacts or approaches the sensing area;
 a plurality of sensor electrodes wired in the sensing area;
 a routing-purpose extension line for connecting a section between individual sensor electrodes and an external circuit provided outside the sensing area; and
 an extension area that is provided in the vicinity of the sensing area and in which the extension lines are arranged densely;
 wherein an electrostatic protection member that suppresses the change of an electrostatic capacitance formed between the body to be detected and the extension line when the body to be detected contacts or approaches the extension area is provided in the extension area, and
 wherein the sensing area and the extension area are integrally covered with a cover sheet, and said electrostatic protection member is formed such that a plate thickness dimension of the cover sheet in the sensing area is formed thinner than a plate thickness dimension of the cover sheet in the extension area.

2. The electrostatic detection apparatus according to claim 1, wherein a step difference is formed between the cover sheet provided in the sensing area and the cover sheet provided in the extension area, and the step difference is formed in at least one of an obverse surface and a rear surface of the cover sheet.

* * * * *